March 3, 1970

R. L. WAGNER 3,498,808

CONFECTION STICK

Filed Sept. 24, 1965

INVENTOR
Richard L. Wagner

BY *Karl W. Flocks*

ATTORNEY

United States Patent Office 3,498,808
Patented Mar. 3, 1970

3,498,808
CONFECTION STICK
Richard L. Wagner, Georgetown, Conn., assignor to Diamond International Corporation, New York, N.Y., a corporation of Delaware
Filed Sept. 24, 1965, Ser. No. 489,932
Int. Cl. A23g 5/00
U.S. Cl. 99—138          6 Claims

ABSTRACT OF THE DISCLOSURE

A confection stick of molded, flexible plastic is provided having longitudinally extending bars or ribs with grooves disposed therebetween. On one surface the grooves underlie the bars on the other surface. The bars are wider than the grooves and have rounded corners.

---

The present invention relates to a confection stick, and, more particularly, to a confection stick formed of flexible, impact resistant plastic material.

Wooden confection sticks have been used successfully for many years. Due to the increasing cost of wood, however, and the decreasing cost of plastic, it has been desirable to form molded plastic confection sticks. However, up to the present time, the molded plastic confection sticks have not been entirely satisfactory for a number of reasons. Thus, where a plastic confection stick is molded in the essentially flat surfaced shape of the old wooden confection sticks, an excessive amount of plastic is used, which, along with the cost of molding, increases the price of the confection stick to one exceeding the price of wooden sticks. In addition, when molding a large flat surface of plastic, the surface configuration has a tendency to have waves therein due to cold flow of the plastic with the consequent result that the stick is not attractive.

It has been attempted to solve the above defects by molding plastic confection sticks with surface configuration therein, noting the design patent to Biehl, Des. 165,-898, which provides a more attractive surface configuration. More recently, I have provided another confection stick design, Des. No. 201,066, May 4, 1965, which incorporates longitudinal grooves and provides a highly satisfactory and pleasing appearance. However, the previously molded confection sticks having surface configurations thereon, including those of the two above designs, while in many cases quite desirable from a design standpoint, may not be entirely satisfactory for other and mechanical reasons.

With the present day high speed manufacture of confections, such as molded ice cream confections, it is essential that high speed automatic equipment be used, including automatic dispensing and inserting mechanisms for feeding the confection sticks. When utilizing such equipment it is essential that each individual stick be free to move laterally and longitudinally from adjacent sticks without interlocking therewith. The above earlier stick configurations, however, have rib constructions which may, under certain conditions, cause interlocking.

Thus, with the advent of the more recent flexible impact resistant polymeric materials, it has become necessary for the performance requirements of the molded confection sticks to be improved. With the more flexible plastic materials, use of certain earlier designs may cause severe interlocking under the normal pressures that exist in orienting devices and in some automatic inserting devices. In addition to jamming up the equipment, such interlocked sticks formed of certain polymers become split and splintered by the automatic handling.

It is therefore an object of the present invention to provide a new and improved molded confection stick for obviating the defects in the prior art, such as indicated above.

It is another object of the present invention to provide a molded confection stick of impact resistant and flexible polymeric material.

It is another object of the present invention to provide molded plastic confection sticks which are exceedingly inexpensive to produce.

It is another object of the present invention to provide molded plastic confection sticks which may be easily, effectively and inexpensively used in automatic dispensing and inserting machines.

These and other objects and the nature and advantages of the instant invention will be more apparent from the following description taken in conjunction with the accompanying drawings wherein.

A molded plastic confection stick, generally shown at 10 is intended to be partially buried into the body of the molded confection so that the other end of the stick 10 protrudes from the confection as a handle. The molded stick is preferably formed of a flexible and impact resistant plastic material such as polystyrene, polypropylene, high density polyethylene or acrylonitrile-butadiene-styrene interpolymer, although any flexible plastic material may be used.

Figure 3:
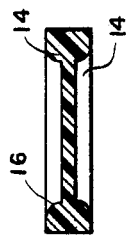
FIG. 3 is a section taken along line 3—3 of FIG. 1 looking in the direction of the arrows.
Figure 5:
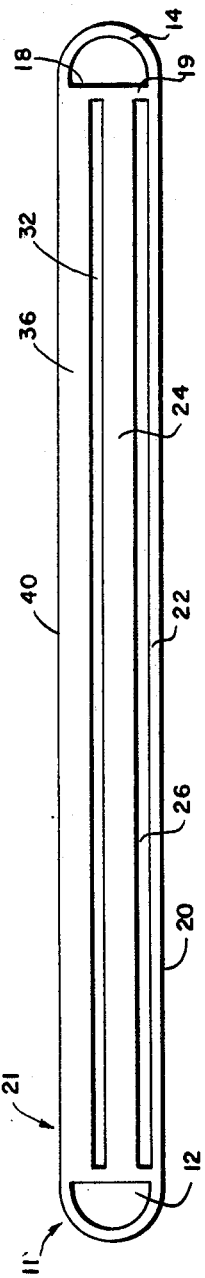
FIG. 5 is a plan view of another embodiment of a stick in accordance with the present invention.

The confection stick 10 is provided with two small ends 11 and a large middle portion 21. Both ends 11 are provided with a pair of semi-circular depressions 12, each semi-circular depression being defined by a semi-circular bar 14, and both surfaces of the stick 10 at each end having such depressions 12. Noting FIG. 3, it can be seen that the semi-circular bars 14 are provided with rounded corners 16.

A transverse wall portion 18 acts as a diameter for the depression 12 and liimts its extent towards the center of the stick. Surfaces 19 extending from the upper portion of each wall 18 act as cords to subtend each semi-circular depression 12.

Figure 4:
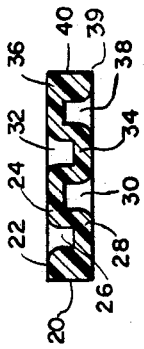
FIG. 4 is a section taken along line 4—4 of FIG. 1 looking in the direction of the arrows.

An important feature of the present invention is the provision of spaced longitudinal bars of a particular character which bars connect the two end portions 11 of the stick 10. The configuration of such longitudinal bars is best seen in FIG. 4. The bars actually consist of a series of corrugations or waves which are spaced transversely across the middle portion 21 of the stick 10, each wave extending longitudinally along the stick. As can be seen from FIG. 4, each bar is considerably larger in transverse extent than is each adjacent groove with the result that it is impossible for a bar to become stuck within a groove. The bars also are provided with rounded corners similar to corners 16 of the bar 14.

A front wall 20 of the stick 10 has an upper surface 22 which is equivalent in width to the semi-circular bar 14 and forms an extension thereof; such upper surface 22 may be considered the first upper longitudinal bar. The second upper longitudinal bar 24 is of substantially greater width than the first upper bar 22, and the first and second upper bars form therebetween a first upper groove 26. The first upper bar 22 and the first upper groove 26 overlay a first lower bar 28 which extends from the front wall 20 on the bottom surface of the stick 10. Underlying the second upper longitudinal bar 24 and lying next to the first lower bar 28 is a first lower longitudinal groove 30. Lying next to the second upper bar 24 is a second upper groove 32 which is similar to the first upper groove 26. Underlying the second upper groove 32 and lying adjacent the first lower groove 30 is a second lower bar 34 which is similar in configuration to the second upper bar 24. Next to the second upper groove 32 is a wide bar 36 which may be considered a third upper bar and which is similar in configuration to the first lower bar 28; the third upper bar 36 also forms part of the border and is an extension of rib 14, its edge surface forming the back wall 40 of the stick 10. Lying beneath the third upper bar 36 and next to the second lower bar 34 is a second lower groove 38. The third lower bar 39 extends beneath the third upper bar 36 in the same manner as the first upper bar 22 which extends above the first lower bar 28.

Figure 1:
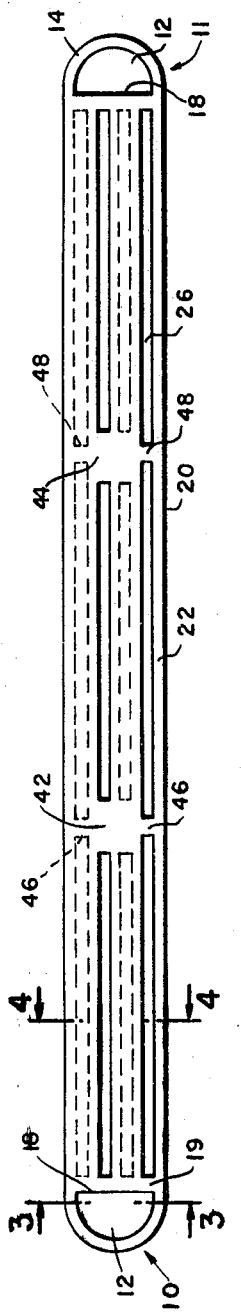
FIG. 1 is a plan view of a molded confection stick in accordance with the present invention.
Figure 2:
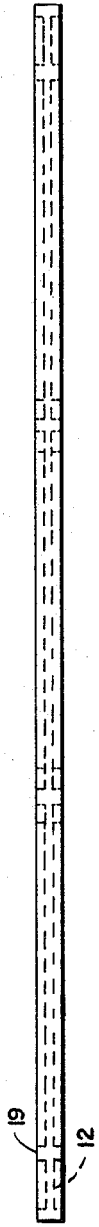
FIG. 2 is a front elevational view thereof.

In the embodiment of FIG. 1 there is shown a pair of generally smooth or flat portions 42 and 44 which intersect the continuity of the longitudinal grooves. The flat portions 42 and 44 act as die ejector pin sites.

Alternatively, or combined with the die ejector pin sites 42 and 44, may be provided transverse ribs 46 and 48, if desired. It may, however, be desirable to provide such transverse ribs without the die ejector pin sites.

The present stick configuration permits the ease of stacking and handling of the confection sticks in spite of the fact that such sticks may be somewhat flexible. The corrugated cross section offers maximum strength, particularly flexible strength, with minimum material and with a minimum, uniform thickness and does not allow a stack of sticks to nest into one another. The corrugated shape also prevents one stick from nesting in an adjacent stick even when slightly bent. The rounded corners of the bars help to prevent interlocking when deformed by hopper pressure and facilitates lateral feeding to the confection mold. In addition, the ribs and grooves serve to effect a positive bonding of the molded confection to the stick.

It will be obvious to those skilled in the art that various changes may be made without departing from the scope of the invention and therefore the invention is not intended to be limited to what is shown in the drawings and described in the specification, but only as set forth in the appended claims.

What is claimed is:
1. A flexible molded plastic confection stick for molded confections, resistant to adjacent stick interlocking, comprising: a middle section having two primary surfaces; a first end connected to said middle section and adapted to extend from said confection, a portion of said middle section and said first end serving as a handle for the confection; a second end connected to said middle section and adapted to extend into said molded confection and be buried therein along with another portion of said middle section; and means to anchor the confection to the stick with positive bonding comprising a plurality of bars extending longitudinally between said ends on both surfaces of said body portion and a plurality of grooves disposed between said bars, the grooves on one surface underlying the bars on the other surface and the bars being wider than the grooves and both surfaces of the entire stick except said grooves being flat.

2. A molded confection stick in accordance with claim 1 formed of an impact resistant plastic.

3. A stick in accordance with claim 1 wherein said ends are rounded and are provided with depressions in the surfaces thereof.

4. A stick in accordance with claim 1 having transverse ribs along said body.

5. A molded confection stick for molded confections, resistant to adjacent stick interlocking, comprising a middle section having two primary surfaces; a first end connected to said middle section and adapted to extend from said confection; a portion of said middle section and said first end serving as a handle; a second end connected to said middle section and adapted to extend into a molded confection and be buried therein along with part of said middle section; said body portion being corrugated to form alternating longitudinal bars and grooves wherein said bars are wider than said grooves, the bars on one surface underlying the grooves on the other surface; said stick being formed of flexible plastic; and both said primary surfaces of said stick except said grooves being flat.

6. A stick in accordance with claim 5, wherein said bars have rounded corners.

References Cited

UNITED STATES PATENTS

| | | | |
|---|---|---|---|
| D. 165,898 | 2/1952 | Biehl | D82—2 |
| 2,469,589 | 5/1949 | Barricini | 99—138 |
| 2,821,481 | 1/1958 | Moslo | 99—138 |

RAYMOND N. JONES, Primary Examiner

WILLIAM C. LAWTON, Assistant Examiner

U.S. Cl. X.R.

99—137